Figure 1:
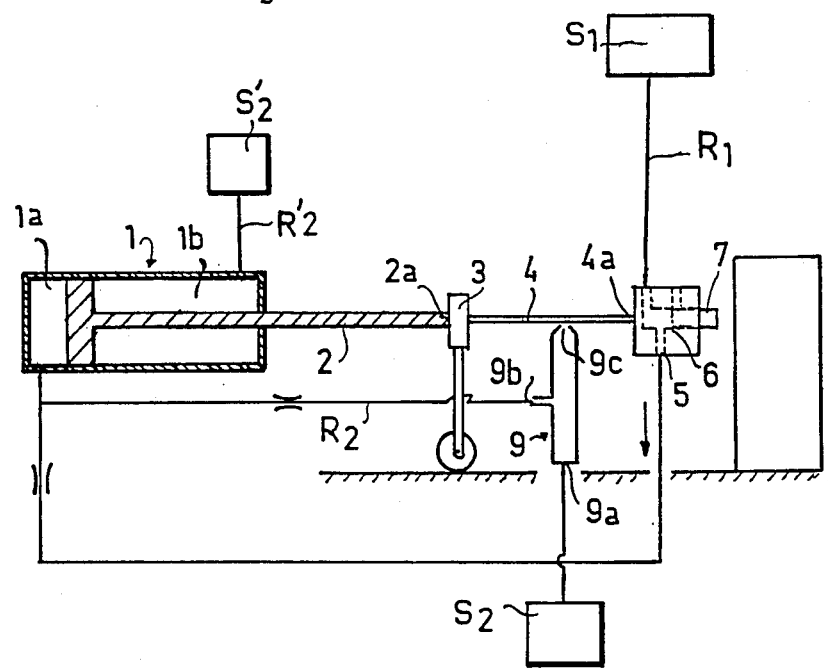

United States Patent [19]
Caen et al.

[11] Patent Number: 4,730,862
[45] Date of Patent: Mar. 15, 1988

[54] PNEUMATIC, TACTILE GRIPPER GENERATING A GRIPPING FORCE CONTROLLED BY THE WEIGHT OF THE HANDLED OBJECT

[75] Inventors: Robert Caen, Cugnaux; Christian Fonade, Ramonville Saint-Agne, both of France

[73] Assignee: Centre National de la Recherche Scientifique, Paris, France

[21] Appl. No.: 4,567

[22] Filed: Jan. 20, 1987

[30] Foreign Application Priority Data

May 30, 1985 [FR] France ............................ 85 08694

[51] Int. Cl.⁴ ........................ B66C 3/16; B25J 15/00
[52] U.S. Cl. ...................................... 294/88; 414/730
[58] Field of Search ............... 294/88, 86.4, 99.1, 294/907, 104, 87.1, 119.1; 901/33, 34, 37, 46; 414/730, 4, 5, 735; 269/32, 90, 224, 265, 267, 275

[56] References Cited
U.S. PATENT DOCUMENTS 4,350,381  9/1982  Hellman .......................... 294/88
4,397,495  8/1983  Lewis ............................. 414/730
4,479,673  10/1984  Inaba et al. .................... 294/88

Primary Examiner—James B. Marbert
Attorney, Agent, or Firm—Harold H. Dutton, Jr.

[57] ABSTRACT

The invention relates to a pneumatic gripper comprising at least one movable finger of which the clamping force is controlled by the weight of the object handled. Each movable finger includes a pneumatic actuator (1) of which the movable member (2) is solidly joined to a flexible blade (4). A stop member (4) is fastened to the free portion of this blade (4) and will touch the object to be seized. Two potentiometers (9, 11) are located on the sides of this blade (4) and their respective outlets (9b, 11b) are connected to an actuation chamber of the actuator so as to achieve a pressure difference between these chambers (1a, 1b) and hence a clamping force directly related to the blade bending. Each finger furthermore includes proximity sensors (7) for the object to be seized, whereby this object can be approached rapidly without danger of tipping it over when making contact with it.

7 Claims, 8 Drawing Figures

PNEUMATIC, TACTILE GRIPPER GENERATING A GRIPPING FORCE CONTROLLED BY THE WEIGHT OF THE HANDLED OBJECT

The invention conceived at the INSTITUT DE MECANIQUE DES FLUIDES of the Toulouse Institut National Polytechnique, which is a laboratory associated with CNRS 040005, relates to a pneumatic gripper comprising at least one movable finger with the sense of touch and of which the gripping force is controlled by the weight of the object handled. In particular it applies to a multi-digital clamp mounted to the end of a manipulator arm or to an industrial robot and capable of seizing and carrying arbitrarily shaped objects of very diverse weights.

The rapid growth of robotics and the importance assumed by robots in many industries for purposes of automating the various production stages have led to creating a great many gripping devices.

One of these devices in particular is described in the Belgian Patent document No. 0.117.679. This patent describes an industrial robot hand using a double-acting jack or actuator as the drive means for the gripper fingers. These fingers consist of several phalanges hinging on each other and are mounted by means of articulations on one hand on the body of the actuator and on the other hand on its movable part. The displacement of this movable part therefore drives these fingers in a direction perpendicular to the longitudinal axis of the actuator. The main drawback of such devices is the absence of a control on the gripping force which, depending only on the pressure of the fluid feeding the actuator, remains constant. Therefore this device makes it impossible to handle fragile objects likely to break. Moreover the use of such a hand requires perfect initial positioning of the object to be carried lest one of the fingers touches this object before the others and tips it over.

Other devices such as described in the European Pat. No. 0.112.729 have been suggested to remedy these drawbacks. This patent relates to a manipulator with a gripper of which the gripping force is selected on the basis of data provided by detection means which check whether the object has been raised or not. These detection means are connected to a regulating electric circuit which can stepwise increase the gripping force from a pre-selected minimum, force to permit lifting the object. Consequently this device allows applying to the gripping fingers the minimum force needed to lift the handled object. However the data transmitted by the detection means are processed by regulation means requiring that a robot be used which includes a relatively complex central processing unit capable of managing these data and to pass on these commands to the gripper fingers. Moreover, this device does not resolve the problem of perfectly positioning at the outset the object which must be seized: the "open" and "close" commands do drive the hand assembly, none of the fingers operating independently.

Other devices such as described in the PCT application published under No. WO 82/01156 make use of a hydraulic actuator as the drive mechanism for the hand. This actuator is of the multi-cylinder or multi-stage type, the various cylinders or stages being supplied or not in relation to data on the weight of the object being lifted that are transmitted to the robot central processing unit (CPU). These data allow controlling the switch of solenoid valves mounted on the various supply mains for the actuator's cylinders or stages. As the previous devices, these also require using a robot with a complex CPU and demand accurate initial positioning of the objects to be seized due to the lack of independence of the various gripper fingers.

A device described in the PCT application #WO 82/01155 is based on similar principles and also uses hydraulic actuators as the drive mechanisms for the hand. The opening and the closing of the fingers of the clamp are controlled from solenoid valves mounted on the supply mains of the actuators driving these fingers. These solenoid valves are controlled from instructions delivered by the robot CPU. This CPU also controls another solenoid valve located upstream of the previous ones and designed to supply the actuators by means of two circuits causing different pressure drops. The robot CPU determines the order of switching between these two circuits on the basis of weight data of the object being lifted that are provided to this CPU.

This device as the previous one entails the drawback of requiring a unit centralizing complex commands, with all the instructions, opening and closing the clamp, detection of the object to be seized, analysis of the gripping force, issuing from this CPU. Moreover this device also fails to solve the problem of dependency of the gripper fingers.

The object of the present invention is to overcome the drawbacks of those known devices and to create an improved gripper capable of determining the proximity of an object, of seizing this object and of carrying it.

One object of the present invention is to create a multi-digital gripper wherein each finger is independent.

Another object of the invention is to create a gripper device capable of carrying an object while applying to it a clamping force which is a function of its transportation conditions.

Yet another object is to provide a gripper which does not require accurate centering of the object to be seized within the gripper axis.

Still another object is to create a pneumatic gripper of which the performance is insensitive to any slight variations in the supply sources.

To that end, the multi-digital gripper for seizing and maneuvering objects comprises at least one movable finger driven by a pneumatic actuator or jack of which the two inner chambers are connected by means of lines to at least one supply source, the gripper having each movable finger comprises: a flexible blade solidly joined to the movable member of the actuator so that a free portion of the blade can bend in a direction perpendicular to its longitudinal axis, a stop member fastened to the free portion of the blade and provided with a stop surface which shall come into contact with an object to be seized, proximity sensors for the object to be seized and means for distributing the fluid flow to each actuator chamber, the distribution means being controlled by the sensors and being designed to:

(a) control a relative pressure difference between the two actuator chambers to allow the movable member to move in the absence of contact between the stop member and the object to be seized, (b) control an approximate re-balancing of the relative pressures of the two actuator chambers when there is contact between the stop member and the object to be seized, at least one pneumatic potentiometer consisting of a fluid container with a supply intake connected to a fluid source, a nozzle with a leakage aperture and with a fluid outlet connected to an actuator chamber, the leakage aperture and with a fluid outlet connected to an acutator chamber, the leakage aperture of the potentiometer being arranged to be opposite the free end of the flexible blade so as to obtain a pneumatic value at the outlet of this potentiometer which depends directly on the blade bending.

Accordingly the implementation of the gripper of the invention requires only as commands from the robot CPU the opening and closing of the fingers and the lifting of the object. These are "go, no-go" commands and hence independent of the weight or shape of the object to be maneuvered, whence the robot CPU now may be simplified.

Once the command to close the fingers has been transmitted, each movable finger will move until touching the object to be seized. As shall be more clearly understood below, the sensors then allow stopping the motion of each actuator rod. It should be noted that because each movable finger is provided with its own sensors, it no longer is necessary to precisely center the object into the clamp axis. After the object has been placed between the fingers, the grip command may be issued and the lifting may take place. The gripper then is autonomous and reacts in relation to the weight of the object and to any accelerations this object may be subjected to. All these factors cause a more or less pronounced deformation of the flexible blade resulting in a variation of the value obtained at the potentiometer outlet and hence in an increasing or decreasing imbalance between the relative pressures of the actuator chambers. Accordingly the clamping force is directly proportional to the weight of the object to be seized and to the carrying conditions of this object.

In a preferred embodiment: the distribution means consist of a pneumatic valve body integrated into the stop member and having at least one intake connected to the supply source and at least one outlet connected to that actuator chamber of which the expansion displaces the movable member toward the object to be seized, the sensors consist of a valve shutter moving between two end positions, namely: (a) an extended position wherein it projects relative to the contact side of the stop member and wherein it allows the fluid to flow between intake and outlet of the valve unit, (b) a retracted position wherein it is within the contact side and where it prevents the flow of fluid between the intake and the outlet of the valve unit.

Accordingly the gripper finger can be operated using a single supply fluid. Furthermore, these pneumatic sensors are easily connected to the pneumatic supply system of the actuator. This connection, as shall be seen further below, offers the advantage of requiring no auxiliary dynamic device.

In another characteristic of the invention, each movable finger comprises two potentiometers of which each outlet is connected to a different actuator chamber, the potentiometers being arranged on each side of the flexible blade so that their leakage rates will vary inversely when the blade is being bent.

In another preferred embodiment, the fluid system feeding the intakes of these potentiometers is designed to introduce different pressure drops so as to achieve a slight pressure offset between the actuator chambers when the blade is at rest.

The presence of a potentiometer on each side of the flexible blade allows to precisely control the respective relative pressures of each cylinder chamber and consequently the gripper clamping force even in the presence of any slight fluctuations in the supply-fluid source. The arrangement of these potentiometers in association with the pressure drops introduced by their respective supply systems in particular makes it possible to apply an initially defined clamping force in accurate manner to the object to be seized, where this force allows the movable finger to detect object slippage during lifting. Moreover, the use of two potentiometers allows doubling the sensitivity of the gripper.

In another feature of the invention, where a quicker response of the flexible blade to object slippage is sought while nevertheless using a sufficiently stiff blade to assure sufficient clamping to hold the object without saturating the potentiometers, each blade advantageously may be provided with at least one intermediate rest arranged in such a way as to modify its flexural constant.

The gripper described above can be fastened to the end of a manipulator arm or to an industrial robot arm, where the robot is equipped with a control CPU in order to achieve a multi-digital gripper. This gripper comprises at least one movable finger and at least one fixed finger arranged in such a manner that they make possible seizing and lifting an object, the manipulator CPU or that of the industrial robot being connected to the gripper in order to drive the fingers.

An outline of the invention having been provided, other features, purposes and advantages will be found in the comprehensive description below and in the attached drawings illustratively showing in non-restrictive manner a simplified version, a preferred embodiment mode and a variation. These drawings are an integral part of the invention.

Figure 2:
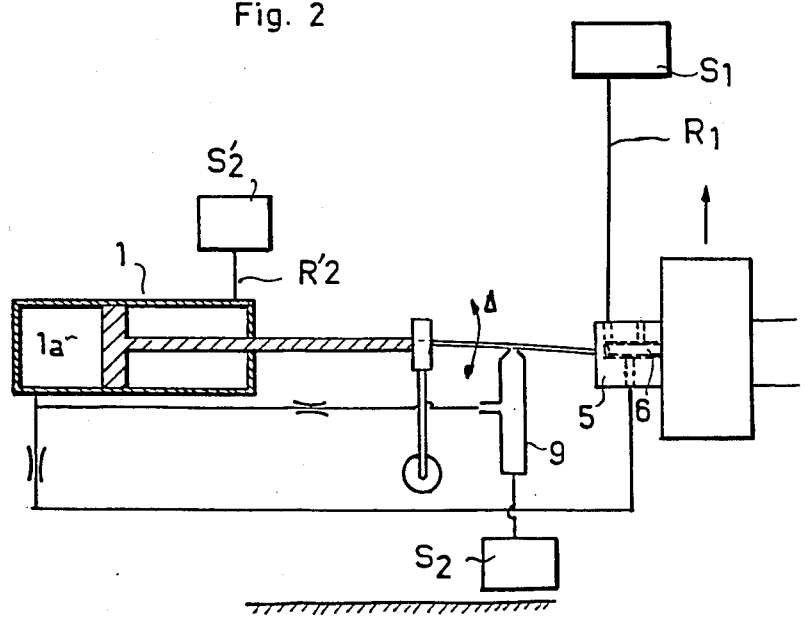
Figure 3:
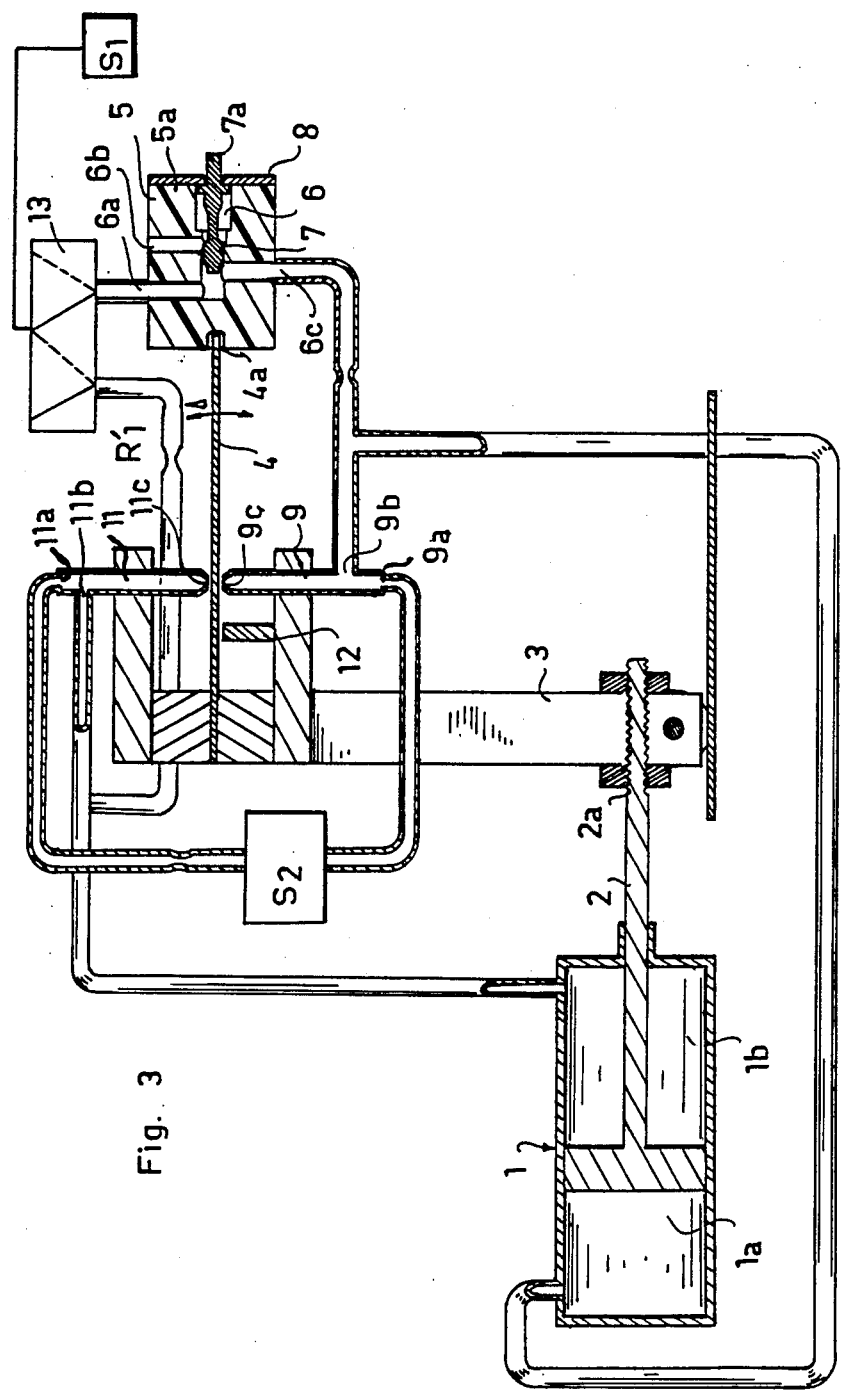
Figure 4A:
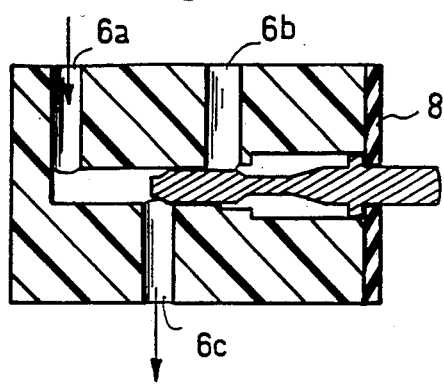
Figure 4B:
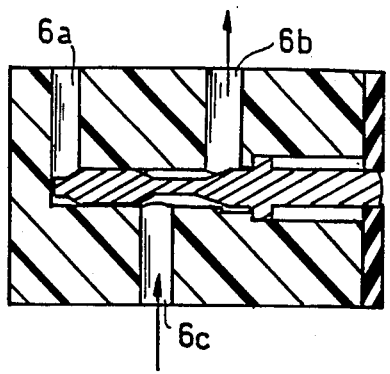
Figure 5A:
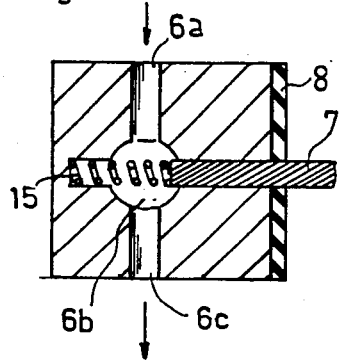
Figure 5B:
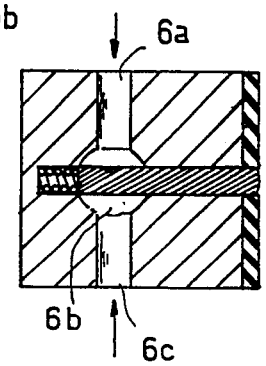
Figure 6:
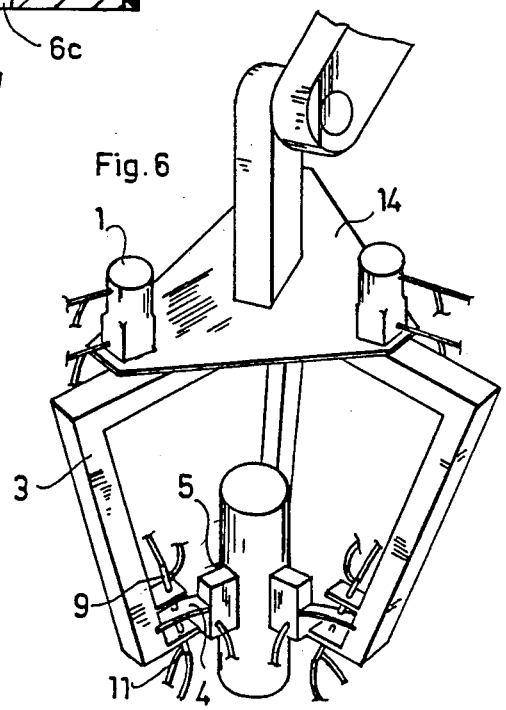

FIGS. 1 and 2 are illustrative schematics of a simplified version of a movable finger of the invention when approaching an object and when gripping this object, FIG. 3 is an overall schematic and a partial sectional view of a preferred embodiment mode of a movable finger of the present invention, FIGS. 4a and 4b are schematic cross-sectional views on an enlarged scale showing the position of a sensor during the approach and gripping stages of the object, FIGS. 5a and 5b are schematic cross-sectional views on an enlarged scale showing an embodiment variation of the sensor during the approach and gripping stages of the object, FIG. 6 is a perspective of an embodiment of a multidigital gripper of the invention.

The simplified device illustratively shown by FIGS. 1 and 2 constitutes one of the fingers of a multi-digital pneumatic gripper, this finger being meant to be fastened to the end of the arm of a manipulator or an industrial robot. Each finger is provided with a proximity sensor for the object to be seized and also with a vertical-force sensor.

Each movable finger includes a pneumatic jack or actuator 1 of which the two inner chambers (1a 1b) are directly connected to a pneumatic supply system. This actuator is designed so as to reduce the friction between the piston and the body of the actuator so as not to degrade the gripper sensitivity. This can be accomplished by suitably machining the inside wall of the actuator body and the periphery of the piston so as to reduce friction while minimizing the leakage between the inner actuator chambers. Illustratively this machining may be in the form of flutings on the piston periphery.

A support 3 is fastened to the end 2a of the rod 2 of this actuator. In turn this support 3 holds the end of a flexible blade 4 made of a rigid material and of which the other end is free so as to bend in a direction (Δ) perpendicular to its longitudinal axis.

A stop member 5 to come into contact with an object to be seized is mounted on this free end 4a of the flexible blade 4. This stop member is mounted on the end of the blade in such a manner that it allows a slight relative play between these two components to avert any flexure of the blade 4 when it makes contact with the object to be seized. Inside this stop member there is an integrated body of a pneumatic valve 6 provided with a supply intake 6a and two outlets 6b and 6c. The intake and outlets issue into two opposite sides of the stop member which are located in planes parallel to the longitudinal axis of the flexible blade 4. The body of this valve 6 is arranged so as to issue into the side 5a which is called the contact side of the stop member 5 and which is opposite the flexible blade 4. Its shutter 7 is designed to move perpendicularly to the side 5a, between two end positions: an extended position, wherein its end 7a projects relative to the side 5a, and a retracted position where this end is approximately in the same plane as the side 5a. Also, the contact side 5a of the stop member is covered with a flexible lining 8 for instance made of rubber to increase the adhesion of this side.

Each finger further includes a pneumatic potentiometer 9 consisting of a fluid container conventionally provided with an feed intake 9a, a nozzle having a leakage aperture 9c and an outlet 9b connected to a chamber 1a or 1b of the actuator 1.

This potentiometer 9 is located near one side of the blade 4 and perpendicularly to the direction of bending of the blade so that the plane of the leakage aperture 9c be substantially parallel to the side. Furthermore this potentiometer is located in such a manner relative to the flexible blade that its leakage rate increases or decreases with the bending of this blade, the pneumatic outlet being connected to the actuator chamber 1a containing its rod or to the other actuator chamber 1b.

This movable finger is connected by three pneumatic lines R1, R2 and R'2 to three supply sources S1, S2 and S'2 or respective constant pressures P1, P2 and P'2.

The first line R1 connects on one hand the source S1 to the feed intake 6a of the stop member 5 and on the other hand one of the operative outlets 6c of this member to the actuator chamber 1a. The second line R2 connects the second source S2 to the feed intake 9a of the potentiometer 9, the potentiometer outlet 9b being connected to the actuator chamber 1a. The third line R'2 directly connects the source S'2 to the actuator chamber 1b.

(This configuration corresponds to a position of potentiometer 9 causing the leakage rate to decrease in relation to the deformation of blade 4. An inverse configuration would have been similarly and equally feasible).

These different lines R1, R2 and R'2 are designed to introduce pressure drops to control the fluid flows and to provide fine control in each case. In particular the line R1 is designed to introduced pressure drops so as to avoid excessive fluid flow from the source S2 toward the stop member 5. Regulating these pressure drops in this line R1 furthermore allows controlling the flow rate and hence the displacement speed of the actuator rod.

Also, the pressure P2 of the supply source S2 can be regulated as a function of the pressure from the fluid of source S'2 which feeds the actuator chamber 1b. in order that, when the blade 4 is free from bending loads, a slight offset exists between the respective relative pressures of these chambers 1a and 1b.

The operation of such a gripper takes place in two stages, namely approaching the object on one hand and on the other seizing and lifting it.

During the approach stage (FIG. 1), the shutter 7 of the pneumatic valve 6 projects from the contact side 5a of the stop member. In this position the shutter 7 allows free fluid flow between the feed intake 6a and the operative outlet 6c of the valve 6 (FIG. 4a). Therefore the supply source S1 is connected to the chamber 1a of the actuator 1 and the difference between the relative pressures of the two chambers 1a and 1b hence is increased by the pressure of the fluid from the source S1, this additional pressure making it possible to rapidly approach the object to be seized.

When contact is made with this object, the shutter 7 acts as a proximity sensor and effects the closure of valve 6: the pressure imparted to the end 7a of this shutter 7 due to the contact with the object to be seized causes the shutter to retract within the valve body 6. In that position, the shutter seals the flow duct connecting the intake 6a to the outlet 6c. This sensor therefore allows rapidly approaching the object while avoiding tipping it over at the time of contact. Furthermore, to allow evacuating the fluid contained in that segment of the line R1 which connects the actuator 1 to the stop member 5, the shutter is designed, when in its retracted position, to allow free flow of the fluid between the operative outlet 6c and the evacuation outlet 6b issuing into the atmosphere (FIG. 4b).

At the end of this approach stage, the contact side 5a of the stop member 5 is therefore placed against the object to be seized and applies against it an initial clamping force of about several tens of grams due to the initial offset between the relative pressures of the two actuator chambers.

This initial clamping force makes it possible at the beginning of the gripping and lifting stage to sense the relative slippage between the object and the contact side 5a of the stop member 5. The gripper sensitivity is increases by using an actuator 1 with minimal friction.

Thereafter, when lifting the object, the deformation of the flexible blade 4 will increase in relation to the friction between the object and the stop member until an equilibrium position is reached which is the function of the object and the stop member until an equilibrium position is reached which is the function of the object weight: this deformation entails a decrease (or, in another configuration, an increase) of the leakage rate of the potentiometer 9 and consequently an increase in the relative pressure of the actuator chamber 1a. Therefore the clamping force applied as a function of the offset between the relative internal pressures of the chambers 1a and 1b of the actuator increases until a force is reached which can balance the weight of this object. In a carefully dimensioned gripper, this clamping force therefore may be that which is merely required to maneuver the object.

The blades used are characterized by the deformation they undergo in relation to the supported weight. As a rule these blades are designed to deform by a magnitude which corresponds to the conventional deviation between blade and potentiometer for supported weights of several kg. The minimum sensed weight depends on the initial clamping force and may be as low as several tens of grams.

It should be noted that in the approach stage the command to close the fingers automatically entails the displacement of the shutter 7 from its retracted position toward it extended position: the pneumatic forces applied by the source S1 to the end of this shutter are sufficient to drive it without resort to a return spring or any other know means.

However the gripper also may be built by using as the sensor a jet-interrupting system integrated into the stop member (FIGS. 5a, 5b: the references here are identical to those of FIGS. 4a, 4b for those components having similar functions). Just as the previously described sensor, this system is provided with a feed intake 6a and an operative outlet 6c, the evacuation outlet being replaced by a vent 6b. the motion of the shutter 7 from its retracted position (stopped flow) to its extended position (free flow) is controlled by a spring 15.

FIG. 3 shows a preferred embodiment mode comprising several design adaptations relating to the movable finger of which the operation was explained above in principle. First of all this gripper comprises two potentiometers 9 and 11 of which the respective intakes 9a and 11a are fed from the same source S2. The outlets 9b and 11b of these potentiometers are each connected to a chamber 1a and 1b respective of the actuator 1.

These potentiometers 9 and 11 are mounted on either side of the flexible blade 4, the planes of their leakage apertures being substantially mutually parallel and perpendicular to the bending direction Δ of the blade 4. Furthermore the pressure drops of the segments of the line R2 connecting the source S2 to the respective intakes of the potentiometers are fitted to provide a slight initial offset between the relative pressures of the two chambers 1a and 1b of the actuator 1 so as to increase the clamping force when the blade is at rest.

Using two potentiometers 9 and 11 in lieu of a single one allows precise regulation of the relative pressures of the actuator chambers in relation to the deformation of the blade 4 even if there were slight pressure variations at the source S2. Using two potentiometers also allows doubling the gripper sensitivity.

An intermediate rest 12 of the flexible blade 4 is fastened to the support 3 and located in such a manner that the distance between its end opposite the blade 4 and this blade is less than the distance between this blade and the leakage aperture of the potentiometer 9 connected to the chamber 1a.

Accordingly this intermediate rest modifies the flexural constant of the blade when gripping takes place. This modification allows using a relatively flexible blade 4 to achieve a sensitive system allowing to increase the weight of the transported objects without saturation of the potentiometers, thanks to the "stiffness" imparted to this blade by the rest 12.

Furthermore the gripper shown in FIG. 3 uses a pneumatic mechanism 13 controlling the closing or opening of each gripper finger.

This mechanism allows connecting the source S1 either by the line R1 to the chamber 1a as described above in order to close the gripper finger, or by a line R'1 to the chamber 1b in order to open the finger.

These movable fingers can be used to achieve a pneumatic gripper mounted to the end 14 of an industrial robot (FIG. 6). In this example the gripper includes at least two movable fingers and a third one which is optionally fixed or mobile. It should be noted that the number and the shapes of the fingers, both movable and fixed, varies as desired depending on the application of the gripper. The movable fingers are mounted on the end of the robot arm so as to converge toward one point located approximately in the axis of symmetry of the clamp.

The commands to open and to close illustratively may be obtained from a go/no-go electric valve controlled by the robot CPU and transmitting the data from a micro-camera for purposes of verifying the object position.

Thus, the clamp having been positioned opposite the object, the CPU commands closing the fingers through the electric valve. Starting from that position and totally independently, the gripper then is fit to move the fingers against the object with a very low clamping force (several tens of grams). It should be noted that when approaching, the fingers are mutually independent and therefore the object need not be positioned precisely in the gripper axis.

Thereupon the robot arm can vertically lift the object, preferably at a low initial speed, in order to let the various fingers adapt themselves to the object weight by increasing their clamping force until it equals this weight. Thereupon more rapid displacements are permissible as far as the object destination, the clamping force being a function of the weight and of the carrying conditions of this object.

We claim:

1. A multi-digital gripper to seize and maneuver objects, comprising at least one movable finger (5) driven by a pneumatic jack or actuator (1) of which the two internal chambers (1a, 1b) are connected by feed lines (R1, R2 and R'2) to at least one supply source (S1, S2, S'2), wherein each movable finger comprises: a flexible blade (4) solidly joined to the movable member (2) of the actuator (1) so that a free portion of said blade can bend in a direction (Δ) perpendicular to its longitudinal axis, a stop member (5) fastened to the free end of the blade (4) and having a contact surface (5a) that will come to rest against the object to be seized, proximity sensors (7) for the object to be seized and distribution means (6) for the fluid flow to each chamber (1a, 1b) of the actuator (1), said distribution means being controlled by the sensors and being designed to:

(a) command a relative pressure difference for the two chambers (1a, 1b) of the actuator to drive the movable member (2) of the actuator (1) in the absence of contact between the stop member (5) and the object to be seized, (b) command an approximate re-balancing of the relative pressures of the two actuator chambers in the presence of contact between the stop member (5) and the object to be seized, at least one pneumatic potentiometer (9) consisting of a fluid container provided with a feed intake (9a) connected to a source (S2) of fluid, of a nozzle provided with a leakage aperture (9c) and a fluid outlet (9b) connected to a chamber (1a) of the actuator (1), the leakage aperture (9c) of said potentiometer being located opposite the free portion of the flexible blade (4) so as to obtain a pneumatic magnitude directly related to the blade bending at the potentiometer outlet (9b).

2. A multi-digital gripper as in claim 1, and wherein each movable finger comprises two potentiometers (9, 11) of which the outlets (9b, 11b) are respectively connected to a different chamber (1a, 1b) of the actuator (1), said potentiometers being mounted on each side of the free portion of the flexible blade (4) so that their leakage rates vary oppositely when said blade is being bent.

3. A multi-digital gripper as in claim 2, and wherein the fluid line (R2) feeding the potentiometer intakes (9a, 11a) is designed to introduce pressure losses of different magnitudes to cause a slight offset between the relative pressures of the actuator chambers (1a, 1b) when the blade is at rest.

4. A multi-digital gripper as in claim 3, and wherein the distribution means consist of a pneumatic valve body (6) integrated inside the stop member (5) and provided with at least one intake (6a) connected to a supply source (S1) and at least one outlet (6c) connected to the chamber of (1a) of the actuator (1) a chamber of which the expansion entails the displacement of the movable member (2) toward the object to be seized, the sensors consist of a valve shutter (7) movable between two end positions:
   (a) an extended position wherein it projects with respect to the contact side (5a) of the stop member (5) and where it allows fluid flow between the intake (6a) and the outlet (6c) of the valve body (6),
   (b) a retracted position wherein it is within said contact side (5a) and where it prevents fluid flow between the intake (6a) and the outlet (6c) of the body of valve (6).

5. A multi-digital gripper as in claim 4, and wherein the body of the valve (6) comprises a feed intake (6a) connected to a source (S1) of fluid, an operational outlet (6c) connected to the chamber (1a) of the actuator (1) and an evacuation outlet (6b) issuing into the atmosphere, the shutter (7) being fitted so that on one hand it makes possible to the fluid to flow between the feed intake (6a) and the operational outlet (6c) when it is in the extended position, and on the other hand it channels the flow between the operationl outlet (6c) and the evacuation outlet (6b) when it is in its retracted position.

6. A multi-digital gripper as in claim 1 and comprising at least one intermediary rest (12) for the flexible blade (4) and mounted in such a manner opposite said flexible blade that it will modify its flexural constant.

7. A multi-digital gripper as in claim 1 and to be mounted on the end (14) of the arm of a manipulator or of an industrial robot provided with a controlling central processing unit, said gripper comprising at least one movable finger and at least one fixed finger arranged in such a manner as to allow gripping and lifting an object, the robot central processing unit or that of the manipulator being connected to the gripper to control the motion of each finger.

* * * * *